United States Patent [19]
Takahashi et al.

[11] Patent Number: 5,329,444
[45] Date of Patent: Jul. 12, 1994

[54] WORK MANAGEMENT SYSTEM EMPLOYING ELECTRONIC BOARD

[75] Inventors: Hideki Takahashi; Teruo Fukunaga; Tomonori Inokoshi; Masataka Abe; Yuji Saito; Masaru Sukagawa; Mitsuaki Watanabe; Tateo Yokozawa; Akira Kikuchi; Hiromi Kato; Takashi Kunugi; Manabu Akimoto; Yusuke Yamazaki, all of Tokyo, Japan

[73] Assignee: Shimizu Construction Co., Ltd., Tokyo, Japan

[21] Appl. No.: 872,811

[22] Filed: Apr. 24, 1992

[30] Foreign Application Priority Data

Apr. 26, 1991 [JP] Japan ................................. 3-097332
Jul. 2, 1991 [JP] Japan ................................. 3-161684

[51] Int. Cl.⁵ ............................................. G06F 15/21
[52] U.S. Cl. .................................................... 364/401
[58] Field of Search ............... 340/717, 780; 364/401, 364/402, 406, 407, 188, 189, 146

[56] References Cited

U.S. PATENT DOCUMENTS

| | | | |
|---|---|---|---|
| 4,368,485 | 1/1983 | Midland | 358/64 |
| 4,700,318 | 10/1987 | Ockman | 364/518 |
| 4,752,889 | 6/1988 | Rappaport et al. | 364/188 |
| 4,800,376 | 1/1989 | Suga et al. | 340/721 |
| 4,896,269 | 1/1990 | Tong | 364/401 |
| 5,040,123 | 8/1991 | Barber et al. | 364/401 |
| 5,050,077 | 9/1991 | Vincent | 364/401 |
| 5,053,970 | 10/1991 | Kurihara et al. | 364/401 |
| 5,111,391 | 5/1992 | Fields et al. | 364/401 |

Primary Examiner—Donald E. McElheny, Jr.
Attorney, Agent, or Firm—Armstrong, Westerman, Hattori, McLeland & Naughton

[57] ABSTRACT

A work management system has input means having a function of inputting coordinate information from the surface of a panel, output means having a function of projecting electronic information onto the panel, and data processing means for executing a predetermined processing, e.g., preparation and input processing of a form, a chart or a drawing, retrieval, editing, totalization, etc., by establishing a correspondence between the information projected on the panel by using the output means and the coordinate information input from the input means. The data processing means displays a list of registered items to be designated in a window for selection of one of the items, whereas, when coordinate information is input from two points for an entry column for time setting, the data processing means draws a bar between the two points. Control information which is conformable to working hours of equipment at a work site, e.g., temporary lighting equipment, is generated by a preliminary arrangement system employing an electronic board, and the control information is transferred to a supervisory control system to effect supervisory control of the equipment on the basis of the control information.

9 Claims, 15 Drawing Sheets

FIG. 1(A)

XXXXX Construction

| Company name | Type of job | Plan | Results | Contents of work | |
|---|---|---|---|---|---|
| ○○ Construction Co., Ltd. | Earthwork | | | | |

| | Safety instructions | Foreman | Work place | Floor | Elements | |
|---|---|---|---|---|---|---|
| | | | | | | |

FIG. 6(A) Equipment schedule (smale size)

Work date : May 17, 1991

| Company name | Equipment name |
|---|---|
| Aoyama Construction Co., Ltd. | Toyo Industry Co., Ltd. |
| Aoyama Civil Engineering | Token Project |
| Itabashi Painting | ... ... |
| ... ... ... | Hashimoto Electric Co., Ltd. |
| Okada Co., Ltd. | Himawari Radio Co., Ltd. |
| Kasumigaseki Civil Engineering & Construction | ... ... |
| ... ... | ... ... |

FIG. 6(B)

Equipment schedule (small size)

Work date : May 17, 1991

| Company name | Equipment name | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|
| Ogurigumi Co.,Ltd. | Table lifter No.001 | | | ■ | ■ | ■ | | | | | | | | | | | | |
| Aoyama Construction Co.,Ltd. | Table lifter No.002 | | | | ■ | ■ | | | | | ■ | ■ | | | | | | |
| Sato Engineering Co.,Ltd. | Table lifter No.003 | | | | ■ | | | | | | ■ | ■ | | | | | | |
| Oura Surveying Co.,Ltd. | Table lifter No.004 | | | | | ■ | ■ | | | | | | | | | | | |
| Aoyama Civil Engineering | Table lifter No.005 | | | | | | | ■ | | ■ | | | | | | | | |
| Toyo Industry Co.,Ltd. | Table lifter No.006 | | | | | ■ | ■ | ■ | | ■ | | | | | | | | |
| Okada Co.,Ltd. | Table lifter No.007 | | | | | | ■ | ■ | | | | ■ | | | | | | |
| Shibuya Heavy Engineering Co.,Ltd. | Table lifter No.008 | | | | | | | | | ■ | ■ | ■ | ■ | | | | | |
| Hashimoto Electric Co.,Ltd. | Table lifter No.009 | | | | | | | | | ■ | ■ | ■ | ■ | | | | | |
| Sanwa Building Material | Table lifter No.010 | | | | | | | | | ■ | ■ | ■ | ■ | | | | | |
| Kaneko Industry Co.,Ltd. | Table lifter No.011 | | | ■ | ■ | ■ | ■ | | | | | | | | | | | |
| Token Project | Table lifter No.012 | | | | | | | | | | | ■ | ■ | ■ | | | | |
| Kosei Co.,Ltd. | Table lifter No.013 | | | ■ | ■ | ■ | ■ | | | | | | | | | | | |
| Chiyoda Temporary Construction Co.,Ltd. | Table lifter No.014 | | | | | | | | | | ■ | ■ | ■ | ■ | | | | |
| Kimura Industry Co.,Ltd. | Table lifter No.015 | | | | | | | | | | | ■ | ■ | | | | | |

FIG. 6(C)

Equipment schedule (large size)

Work date : May 17, 1991
Equipment name : Tower crane 180

| Company name | 6 | 7 | 8 | 9 | 10 | 11 | 12 | 13 | 14 | 15 | 16 | 17 | 18 | 19 | 20 | 21 | 22 | Contents of work |
|---|---|---|---|---|---|---|---|---|---|---|---|---|---|---|---|---|---|---|
| Aoyama Construction Co.,Ltd. | | | | | | | | | | | | | | | | | | |
| Mizuho | | | | | | | | | | | | | | | | | | |
| | | | | | | | | | | | | | | | | | | |
| | | | | | | | | | | | | | | | | | | |
| | | | | | | | | | | | | | | | | | | |

FIG. 10 (A)

| Port No. | State | Alarm | Equipment | Display information |
|---|---|---|---|---|
| 0 0 1 | 1 (ON) | 0 | | |
| 0 0 2 | 0 (OFF) | 1 | | |
| | | | | |

FIG. 10 (B)

| Port No. | Command | Confirmation information | Equipment | Display information |
|---|---|---|---|---|
| 1 0 1 | | | | |
| 1 0 2 | | | | |
| | | | | |

| Port No. | State |
|---|---|
| 0 0 1 | 1 (ON) |
| 0 0 3 | 0 (OFF) |
| | |

| Time | Port No. |
|---|---|
| | |
| | |
| | |

| Time | Port No. | Contents |
|---|---|---|
| 6 | × × × | 1 |
| ⋮ | ⋮ | ⋮ |
| 8 | 0 0 1 | 1 |
| ⋮ | ⋮ | ⋮ |
| 20 | 0 0 1 | 0 |

WORK MANAGEMENT SYSTEM EMPLOYING ELECTRONIC BOARD

BACKGROUND OF THE INVENTION

The present invention relates to a work management system employing an electronic board which may be used for a meeting held at a construction work site or the like and for the control of temporary lighting equipment.

It is said that the number of persons working per day at a construction work site, for example, is about one fifth of all the workers who are under management at the work site. In other words, although workers sent from contractors of various types of industry engage in working every day, these workers are frequently replaced day by day in accordance with the progress of work.

In general, at a work site of rather large scale, the number of associated companies (contractors) or the number of different types of job engaged in working per day is in the range of several tens to a hundred, so that it is essential to hold a preliminary meeting for checking the progress of work and adjusting it to the term of works.

Accordingly, at a construction work site or other similar work site where contractors of various types of industry are mixedly engaged in working, it is very important to hold a preliminary meeting at the time of starting work or at a fixed time and issue a work schedule and safety instruction form.

FIG. 1 shows an example of work schedule and safety instruction forms.

For example, a work schedule and safety instruction form consists of various items, i.e., companies, e.g., associated companies, contractors, etc., types of job, plan, results, contents of work, safety instructions, foreman, types of construction, work place, floors, elements, etc., so that it is necessary to enter data in a large number of lines, i.e., from several tens of lines to nearly one hundred lines, even if such pieces of data are arranged by the day. Accordingly, even if large sheets of paper are used to write these pieces of data, a multiplicity of sheets of paper are needed, so that it is not easy to file all the sheets of paper. In addition, preliminary arrangements for such work need not only a work schedule and safety instruction form but also other forms, e.g., a check list of transportation vehicles, a schedule of use of cranes, a drawing for indicating dangerous operations, a work layout drawing, a progress control chart, etc., for confirmation of work and other purposes. There is therefore a need for a wide space for presentation of such charts and drawings.

At a work site where a large number of associated companies and workers who are different in the type of job are replaced every day, as described above, there are a large number of items, i.e., the associated companies, types of job and other items, must be checked one by one in order to make preliminary arrangements by using a work schedule and safety instruction form. Accordingly, the work schedule and safety instruction form increases in size, resulting in a lowering in the efficiency at the time of making preparations for the preliminary meeting and carrying it on.

For example, early attendance, overtime work and so forth occur daily in some of the operations at such a construction work site. Therefore, it is one of the main managemental affairs to control information about early attendance, overtime work and so forth and make an inspection of lighting or the like for such work. However, since the associated companies and work places are large in number and dispersed, it is hard work to input information about such matters.

At a work site where the recent scaffoldless construction method is adopted, high-lift trucks, e.g., a table lift truck, a crawler boom lift truck, etc., are introduced for work carried out at high places, e.g., a ceiling. In a construction work of large scale, several hundreds of machines, e.g., cranes and high-lift trucks, are needed. These machines are introduced into the work site on lease and lent to workers as the need arises. There are cases where machines are left in foremen's care, i.e., several machines for each foreman. In such cases also, one contractor may have ample machinery, while another may be short of machinery. As a whole, the number of machines introduced on lease is rather large in comparison to the others.

In actuality, however, since such machinery is not under control, machinery lending and return conditions cannot clearly be grasped, so that there may be a large number of machines left as they are at a construction site. In particular, battery-operated machines are likely to be left as they are because they cannot be used when the battery is dead. In a high-rise building, it takes time to find idle equipment if any, so that there is a large amount of idle equipment. Therefore, a large-scale construction work that needs, for example, 20 months, until it is completed from the start of the construction will involve exceedingly high lease costs for idle equipment.

In addition, when there is a change in regular working hours or overtime work occurs at a construction work site, it is necessary to turn on temporary lighting equipment for the extra work and turn it off after the completion of the work for the day. In general, temporary lighting equipment at a construction work site has heretofore been turned on and off by a person in charge or by a lighting control system.

According to the former lighting control method, a person in charge remains until all operations are finished to confirm the finish of the work and turn off the temporary lighting equipment. According to the latter lighting control method, a lighting plan is made on the basis of arrangements for work made every day and by taking into consideration a stair, a passage, etc. serving as a lead line on the basis of a work schedule report, work area and time, etc., and a work area that needs lighting and lighting time are input to the lighting control system to turn off the lighting automatically.

However, with the former method, the person in charge must remain until all the work is finished, so that the working time of the person in charge lengthens undesirably. Moreover, since the person in charge turns off the lighting equipment inside the work site, he or she must return in the dark, which is dangerous. In addition, since it is troublesome to light up the work site in detail for each area of work, all the lighting equipment in the work site is turned on unavoidably, resulting in a waste of power consumption.

With the method that employs a lighting control system, the operation of turning off the lighting equipment is automated, so that the problems experienced with the method wherein a person in charge turns on/off the lighting equipment are solved. However, it takes time and labor to make a lighting plan and input lighting data. In addition, since a person who understands the control system is in charge of the control every day, it is difficult and complicated for other people to use the control system, so that loads on workers are likely to be imbalanced, and it is likely that the lighting control system will fall out of use.

SUMMARY OF THE INVENTION

It is an object of the present invention to provide a work management system employing an electronic board which is designed so that, even if no wide space is available, a large amount of work management information can be handled efficiently with an ordinary space for a preliminary meeting, and it is possible to hold preliminary meetings for work, for example, simultaneously at different places.

It is another object of the present invention to automate the control operation of turning on/off temporary lighting equipment at a construction work site to thereby reduce the load on a person in charge and an operator of the lighting control.

It is still another object of the present invention to enable setting of a lighting control system to be automatically made on the basis of information obtained at a preliminary meeting for work.

To these ends, the present invention provides a work management system employing an electronic board, comprising: input means having a function of inputting coordinate information from the surface of a panel; output means having a function of projecting electronic information on the panel; and data processing means for executing a predetermined processing, e.g., preparation and input processing of a form, a chart or a drawing, retrieval, editing, totalization, etc., by establishing a correspondence between the information projected on the panel by using the output means and the coordinate information input from the input means, the data processing means being arranged to execute the input processing of a form, a chart or a drawing such that, when coordinate information is input from one point for an entry column for a designated item, the data processing means displays a list of registered items to be designated in a window for selection of one of the items, whereas, when coordinate information is input from two points for an entry column for time setting, the data processing means draws a bar between the two points.

In addition, the present invention provides a work management system employing an electronic board, comprising: input means including a card reader that reads information stored in a memory card, a data input unit capable of inputting image data, and a coordinate input panel for inputting positional information represented by X-coordinate and Y-coordinate values; output means including a projector that projects electronic information on the coordinate input panel, a display that displays electronic information on a screen, and a printer that prints out electronic information; data processing means for executing a predetermined processing, e.g., preparation and input processing of a form, a chart or a drawing, retrieval, editing, totalization, etc., by recognizing coordinate values input from the coordinate input panel in correspondence to the electronic information projected on the coordinate input panel and combining the recognized information with data read by the card reader and data input from the data input unit, and the data processing means further executing storage of data into a memory and output processing of data to the output means, thereby enabling preliminary arrangements to be made on the basis of data that is coordinate-input from an image of electronic information displayed on the coordinate input panel.

In addition, the present invention provides a work management system employing an electronic board, comprising a preliminary arrangement system for executing input, generation, updating and other processing for items to be prearranged for work concerning a work schedule and safety instruction form or the like by using the electronic board, and a supervisory control system for effecting supervisory control of equipment at a work site, e.g., temporary lighting equipment, wherein the preliminary arrangement system generates control information conformable to working hours of equipment to be controlled from the results of input, generation, updating or other processing executed for the items to be prearranged and transfers the control information to the supervisory control system to effect supervisory control of the equipment on the basis of the control information.

In the work management system according to the present invention, electronic information is developed and projected on the panel by using the output means, and a coordinate value that is input from the panel is recognized in correspondence to the electronic information projected on the panel. Accordingly, it is possible to display on the panel data of a form, a chart or a drawing stored in a memory in advance and write data into a column in the form or the like on the panel as desired. Thus, preliminary arrangements can be made in the same way as in the case of using a board as in the conventional practice. Since electronic information stored in the memory is developed and displayed on the panel, it is possible to handle a large-sized form, chart or drawing irrespective of the panel size. If necessary, a desired region can be cut out and displayed on the panel for entry and setting of each item.

In addition, control information which is conformable to working hours of equipment at a work site, e.g., temporary lighting equipment, is generated by the preliminary arrangement system from the results of input, generation, updating and other processing executed for items to be prearranged, and the control information is transferred to the supervisory control system to effect supervisory control of the equipment on the basis of the control information. Accordingly, even when there is a change in the working hours or overtime work occurs, the control of equipment, e.g., temporary lighting equipment, can be automatically effected simply by making arrangements at a preliminary meeting for work, which is held regularly. There is therefore no need for a person in charge of the control of equipment, e.g., temporary lighting equipment. It is also unnecessary to make a plan concerning the control of such equipment, and there is no need for labor to input information for the control.

Still other objects and advantages of the invention will in part be obvious and will in part be apparent from the specification. The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 1(A) and 1(B) show an example of work schedule and safety instruction forms;

FIGS. 6(A)–6(C) show exemplarily frames of equipment schedules projected on the electronic board;

FIGS. 10(A) and 10(B) show exemplarily a supervisory table and a control table;

DESCRIPTION OF PREFERRED EMBODIMENTS

Figure 2:
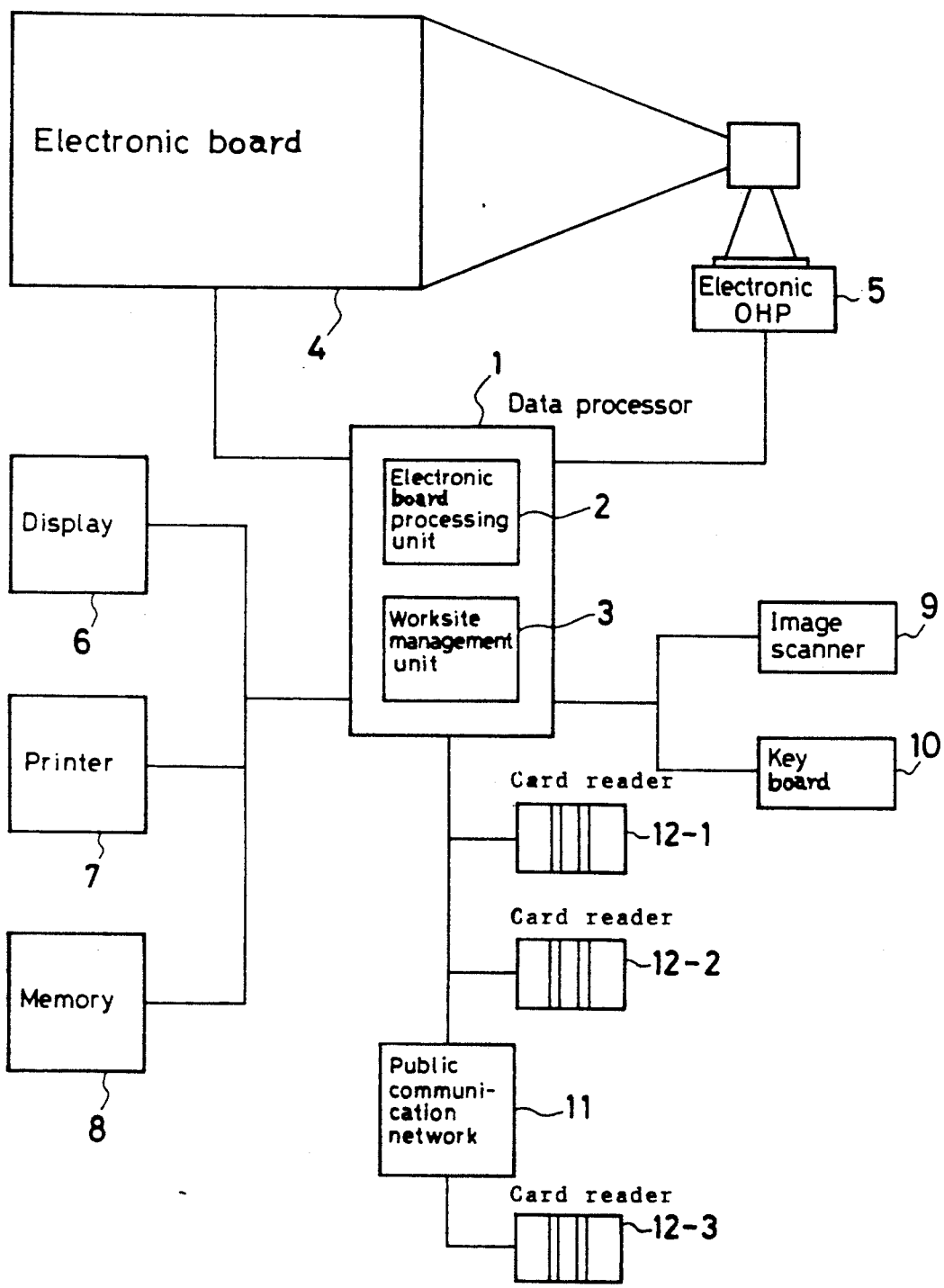
FIG. 2 is a block diagram of one embodiment of a preliminary arrangement system employing an electronic board according to the present invention.

Referring to FIG. 2, an electronic board 4 is, for example, a coordinate input panel which is arranged such that sense lines are stretched in directions X and Y to form a matrix, and the surface of this matrix is covered to form a display screen which enables coordinate data to be input from the surface thereof. Coordinate input may be effected by biasing a magnetic field, electric field, pressure, etc. with a special pen and detecting the biased position on the basis of X-coordinate and Y-coordinate values. An electronic OHP 5 is a projector formed by combining an OHP with a display unit, for example, a liquid-crystal display unit, which displays electronic information in a developed form. The electronic OHP 5 projects an image formed on the screen of the display unit onto the electronic board 4.

Card readers 12-1 to 12-3 are installed, for example, at an entrance/exit gate of a work site and in the work site. At an entrance/exit gate, a card reader has two read heads for entrance and exit, respectively, whereas, in a work site, a card reader has two read heads for lending and return of equipment. The card readers 12-1 to 12-3 are used to read information from memory cards carried with workers. The card readers 12-1 and 12-2 are connected to a data processor 1 through a special communication network, whereas the card reader 1-3 is connected to the data processor 1 through a public communication network 11. The memory cards include magnetic cards, optical cards, IC cards and so forth. Memory cards carried with workers are stored with information characteristic of each individual worker and work site management information, e.g., those concerning labor control, work schedule control, health control, accident history and prediction, etc. Memory cards used for lending of equipment are each attached to a key of equipment and stored with management information concerning the use and and return of the equipment.

The data processor 1 has an electronic board processing unit 2 and a work site management unit 3. The electronic board processing unit 2 processes input/output information concerning the electronic board 4 and the electronic OHP 5, and the work site management unit 3 processes work site management information input from the card readers 12-1 to 12-3 and also executes input processing of information, e.g., data and commands, input from an image scanner 9 and a keyboard 10, storage of data to a memory 8, and data output processing to a display 6 and a printer 7.

The electronic board processing unit 2 establishes correspondence between pixels of an image projected on the electronic board 4 from the electronic OHP 5 and coordinate values on the electronic board 4 to recognize information that is selected from the projected image by coordinate values input from the electronic board 4, and it also executes a processing based on the recognition thus made. For example, when a menu of a plurality of commands and a plurality of pieces of data is displayed on the electronic board 4 from the electronic OHP 5, the command and data display regions are represented by corresponding coordinate values. Accordingly, when a coordinate value is input to the electronic board processing unit 2 from the electronic board 4 displaying the image, the processing unit 2 recognizes a command or data display region represented by the input coordinate value and then executes processing of the designated command or input processing of the selected data. If the handwriting input mode is set, handwritten characters are input as continuous information of coordinate values.

The work site management unit 3 reads data from a memory card carried with each individual worker and from a memory card attached to a key of equipment through the card readers 12-1 to 12-3, installed at the work site entrance/exit gate and inside the work site, and executes registration, totalization, calculation, etc. in accordance with the data transferred thereto from the card readers 12-1 to 12-3. For a memory card carried with each individual worker, reading is executed when the worker enters and leaves the work site; for a memory card for management of the work site, reading is carried out at the opening time, or after the closing time, or at other appropriate time.

The memory card carried with each individual worker is stored with information, i.e., the worker's name, birth date, sex, company's name, type of job, working start year, date of measurement of blood pressure and measured blood pressure, and whether or not the worker has a license or qualification, experience of an accident or a handicap. Accordingly, by totalizing the pieces of read information, it is possible to obtain a number of workers in the work site for each company or each type of job, for example. In addition, if there is a work that has a strong probability of occurrence of an accident, it is possible to find whether or not there is a worker having experience of such an accident. It is also possible to search for a worker which is in poor health, totalize working hours and overtime working hours in a predetermined period of each individual worker, and obtain a number of workers engaged in each work and man-days for each work.

The memory card attached to a key of equipment is stored with information, i.e., the equipment's name, managemental number, etc. By inputting the stored information to the work site management unit 3 from the card reader when the equipment is lent and returned, it is possible to administer the conditions and time of use of each equipment.

The image scanner 9 is used to read images of forms, charts and drawings, for example, a work schedule and safety instruction form such as that shown in FIG. 1, a progress control chart, a work layout drawing, etc. The image read by the image scanner 9 can be projected on the electronic board 4 by the electronic OHP 5. The keyboard 10 is used to input numerical values, character data, function data, etc. The keyboard 10 may also be used to input a form, chart or drawing prepared.

For example, a work schedule and safety instruction form consists of various items, i.e., companies, e.g., associated companies, sub-contractors, etc., types of job, plan, results, contents of work, safety instructions, foreman, types of construction, work place, floors, elements, etc., as shown in FIG. 1, so that it is necessary to enter data in a large number of lines, i.e., from several tens of lines to nearly one hundred lines, even if such pieces of data are arranged by the day. Accordingly, even if large sheets of paper are used to write these pieces of data, a multiplicity of sheets of paper are needed, so that it is not easy to file all the sheets of paper. In addition, preliminary arrangements for such work need not only a work schedule and safety instruction form but also other forms, e.g., a check list of transportation vehicles, a schedule of use of cranes, a drawing for indicating dangerous operations, a work layout drawing, a progress control chart, etc., for confirmation of work and other purposes.

The arrangement and operation of the system will be explained below.

Figure 3:
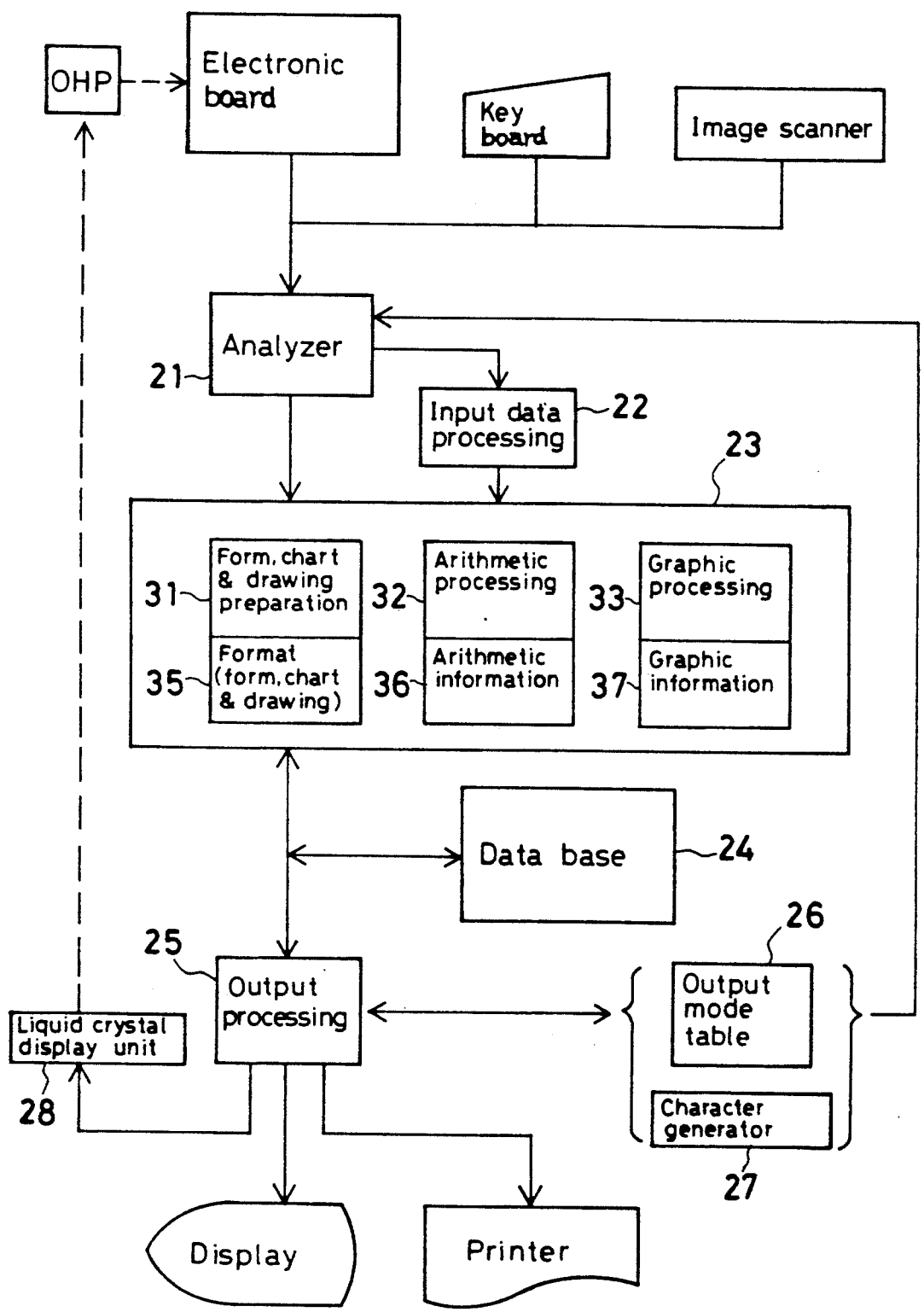
FIG. 3 is a block diagram showing the arrangement of the preliminary arrangement system employing an electronic board according to the present invention.

Referring to FIG. 3, an analyzer 21 analyzes input data by referring to a CG (character generator) 27, which generates characters or images, in accordance with an operation mode held in an output mode table 26 and executes input processing, form, chart and drawing preparation processing, arithmetic processing, graphic processing, etc.

In the case of character information, for example, an input data processing unit 22 inputs a character code and address (coordinate position), whereas, in the case of image information, the input data processing unit 22 inputs the address of each of the pixels constituting the image.

A form, chart and drawing preparation processing unit 31 stores formats 35 of forms, charts and drawings and processes input data according to the formats 35 to prepare forms, charts and drawings. At a general construction work site, various forms are used in addition to a work schedule and safety instruction form, e.g., a check list of transportation vehicles, a schedule of use of cranes, a drawing for indicating dangerous operations, a work layout drawing, a progress control chart, etc. An arithmetic processing unit 32 stores arithmetic information 36 and totalizes forms and charts as well as plan and results information. Achievement information includes individual information concerning each individual worker and information about the use of equipment, which are read by card readers installed at the work site entrance/exit gate and inside the work site, as described above. By retrieving, editing and totalizing these pieces of information, it is possible to prepare various forms, e.g., a list of persons entering the work site per cooperative company, a tabulation of labor per cooperative company, a tabulation of labor per type of construction work, a table of items of work, a labor shift table, a personnel shift graph, etc. A graphic processing unit 33 stores graphic information 37 to develop a graphic form. A data base 24 stores input data, data that is read from the card readers at the work site and totalized as well as edited, and data processed in the form, chart and drawing preparation processing unit 31, the arithmetic processing unit 32 and the graphic processing unit 33. An output processing unit 25 outputs data to a liquid crystal display unit 28, a display or a printer by referring to the CG (character generator) 27, which generates characters and images. The output image, operation mode and other output state are held in the output mode table 26.

The following is a description of an example of the data input processing using a work schedule and safety instruction form, in which an image displayed on the liquid crystal display unit is projected on the electronic board by using the OHP.

The work schedule and safety instruction form is large in both the number of items and the number of lines, as described above, so that it cannot completely be displayed on the electronic board. For this reason, in the example shown in FIG. 4, each item in the displayed form is divided into sections each consisting of a predetermined number of lines. Accordingly, the work schedule and safety instruction form for one day consists of several pagas, and such work schedule and safety instruction forms for several days are placed under management. Therefore, the frame of the work schedule and safety instruction form that is projected on the electronic board is provided with keys used to change frames to select a desired one and also select a processing mode, etc.

Figures 4A, 4B:
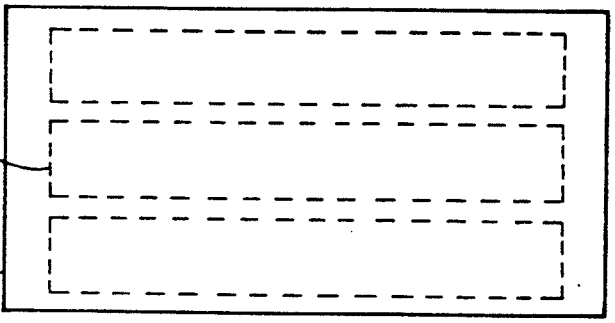
FIGS. 4(A) and 4(B) show exemplarily frames projected on an electronic board by an electronic OHP.

In FIG. 4A, reference numeral 41 denotes a page select key which is arranged such that, when a numeral is selected, the frame displayed on the screen is changed to the page corresponding to the numeral selected. Reference numeral 42 denotes a document select key for changing the document on the screen to a predetermined one corresponding to the selected symbol, e.g., A (check list of transportation vehicles), B (drawing for indicating dangerous operations), C (work layout drawing), etc. A shift key 43 is used to shift the frame in which the right-hand side of an item overflows. A date designating key 44 is arranged such that, when a numeral portion of the day, month or year section is selected, a ten-key pad is displayed in a popup screen to enable designation of a date by using the ten-key pad, and the frame displayed on the screen is changed to the work schedule and safety instruction form of the designated date. Processing mode select keys 45 include an input key for setting a data input (execution and decision) mode, an item cancel key for setting a mode of selectively canceling an item, a write key for setting a mode of entering data into the space for each item, etc.

An outline of the general operation of the system will be explained on the assumption that a work schedule and safety instruction form with no information input therein yet is developed in the preset format by the data processor and projected on the electronic board by the projector.

First, the write mode is set by using the write key among the processing mode select keys 45. This is realized as follows. The image that is projected on the electronic board by the projector is placed under the management of the data processor so that selection of a coordinate value in a predetermined region indicated to be "write region" is recognized as selection of the write mode. More specifically, when one point in the region indicated to be "write region" is designated with a special input pen, the coordinate value of the designated point is recognized by the electronic board (coordinate input panel), and the recognized coordinate value is transferred to the data processor. The data processor recognizes the coordinate value as the write mode select key from the condition of the frame projected by the projector, and awaits the next input information in the write mode.

Figure 5:
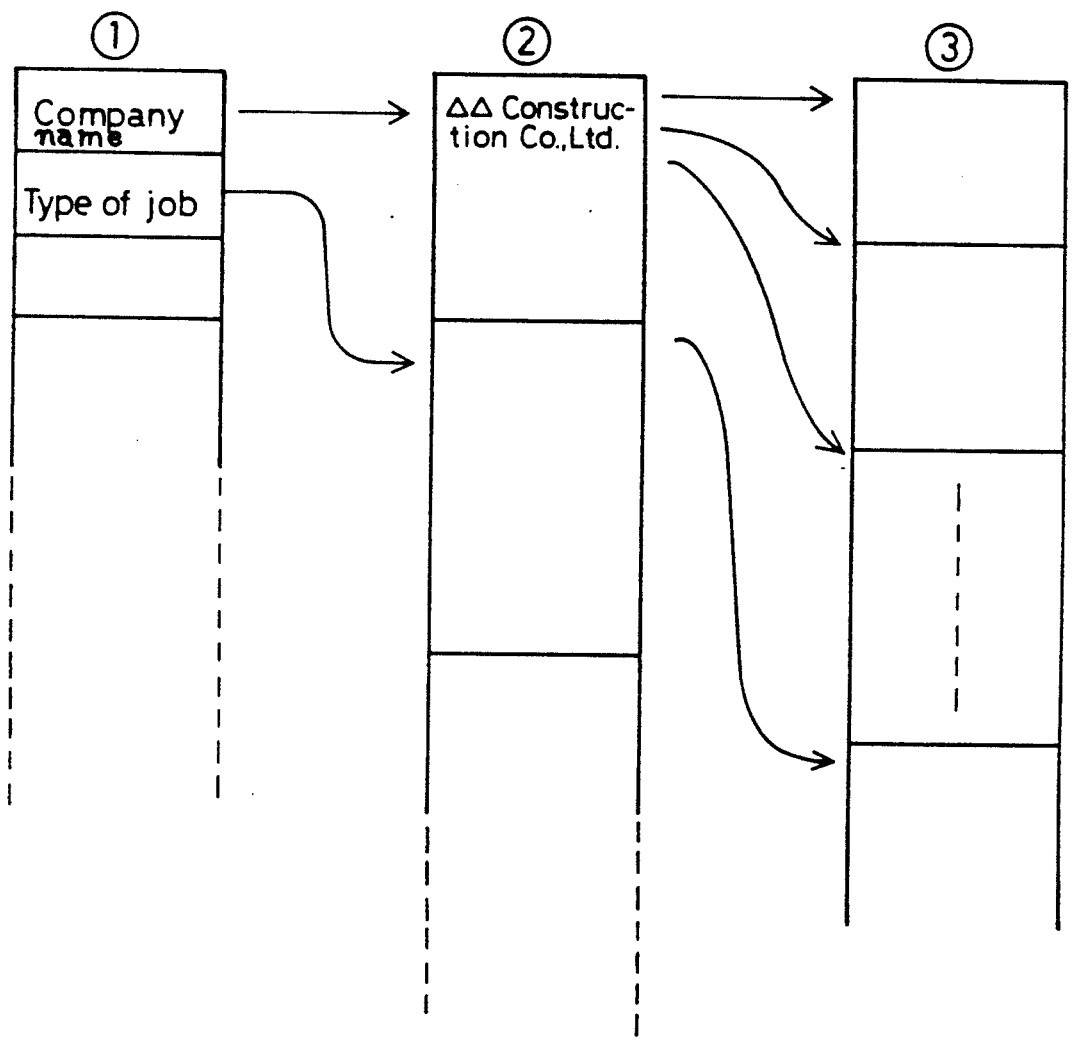
FIG. 5 show a data structure.

Accordingly, if the hatched region, shown in FIG. 4A, is designated with the input pen and the coordinate value is input, the data processor recognizes that the item of "company" has been selected, and displays an indication of [handwriting input] and a list of companies in a window (popup screen) 46, as shown in FIG. 4A. The list of companies contains the names of companies registered in advance. Thus, item input is executed by selecting a company name. For this purpose, a tree structure is employed as a data structure for each item, as shown exemplarily in FIG. 5. Thus, if the item 1 is selected, a list of data 2 is output for each item. If necessary, the data structure may further contain data 3 in the lower-level stratum immediately below the data 2. If the desired company name is not found in the company list, handwriting input is designated.

In the case of handwriting input, a handwriting input window 47, together with an input region 48, is displayed, as shown in FIG. 4B. It should be noted that FIG. 4B shows exemplarily the right-hand side frame, switched over from the frame shown in FIG. 4A by using the shift key 43; therefore, if handwriting input is designated on the frame shown in FIG. 4A, the handwriting input window 47, together with the input region 48, is displayed on the frame shown in the figure, as a matter of course. If a company name is written in the input region 48 with the input pen and then the input key among the processing mode select keys 45 is selected, the data processor recognizes the corresponding coordinate value as image data and inputs it as a company name in the space for the item of "company". As a result of this processing, the company name input by handwriting is displayed as it is in the hatched region shown in FIG. 4A. In this way, each item is written.

Data that is to be entered into the work schedule and safety instruction form is set as described above. The item cancel, insert, move and copy keys among the processing mode select keys 45 are used to execute respective processings with respect to data entered into the space for each item. The work schedule and safety instruction form may be prepared by using a keyboard, or by reading information stored on a memory card with a card reader, or by reading a hard copy with an image scanner, as a matter of course.

The following is a description of an example of the management of the equipment schedule, the overtime work schedule, the registration of a delivery route.

The equipment schedule is designed so that the schedule of use of equipment, e.g., cranes and high-lift trucks, is written thereon to execute equipment utilization management. In the case of equipment, a large-sized machine, for example, a tower crane, may be used by several contractors by turns in one day, whereas a small-sized machine, for example, a table lifter, is likely to be used exclusively by one contractor by the day. FIGS. 6A and 6B show an example of the equipment schedule which may be applied to small-sized machines which are used by respective contractors exclusively, while FIG. 6C shows an example of the equipment schedule which may be applied to a large-sized machine which a plurality of contractors use by turns for hours allotted thereto, respectively.

For example, the equipment schedule for small-sized machinery consists of columns of "company name" and "equipment name", and a timetable showing the periods of use of machines. The equipment schedule for large-sized machinery consists of columns of "company name" and "contents of work", and a timetable. If the column of "company name" is designated, a list of registered company names is displayed in a window, as shown in FIG. 6A. If a company name in the list is designated, the designated company name is written in the column of "company name" on the equipment schedule, as shown in FIG. 6B. More specifically, the column of "company name" and a company name in the list are each recognized by collating the designated coordinate value on the electronic board with the corresponding position in the equipment schedule displayed on the electronic board, and then the necessary processing is executed to write the designated company name in the column of "company name". The same is the case with the column of "equipment name". In regard to the date of work, a calendar and a ten-key pad are displayed in a window. For the timetable, when the positions of the times of start and end of use of equipment are designated, bars such as those shown in FIGS. 6B and 6C are drawn. The contents of work are entered by the handwriting mode. The arrangement may be such that, if the desired company name or equipment name is not found in the registered list, it is entered by the handwriting mode, while the contents of work are also selected from a registered list, as a matter of course.

In regard to early attendance at the work site and overtime work, first, a plan view of each floor, for example, is input from the image scanner because the area of work changes frequently from one place to another. Then, the image of such a plan view is displayed on the electronic board. In the case of a rectangular area, for example, the four corners are designated by maneuvering a pointing device, and a section symbol is input to thereby execute section registration. Thereafter, an early attendance and overtime work schedule is displayed in the same way as in the case of the equipment schedule to input a company name and overtime working hours for each section. By using the sections and hours written on the early attendance and overtime work schedule as control information for air conditioning and lighting, it is possible to control air conditioning and lighting equipment according to the time schedule of early attendance and overtime work.

Figure 7:
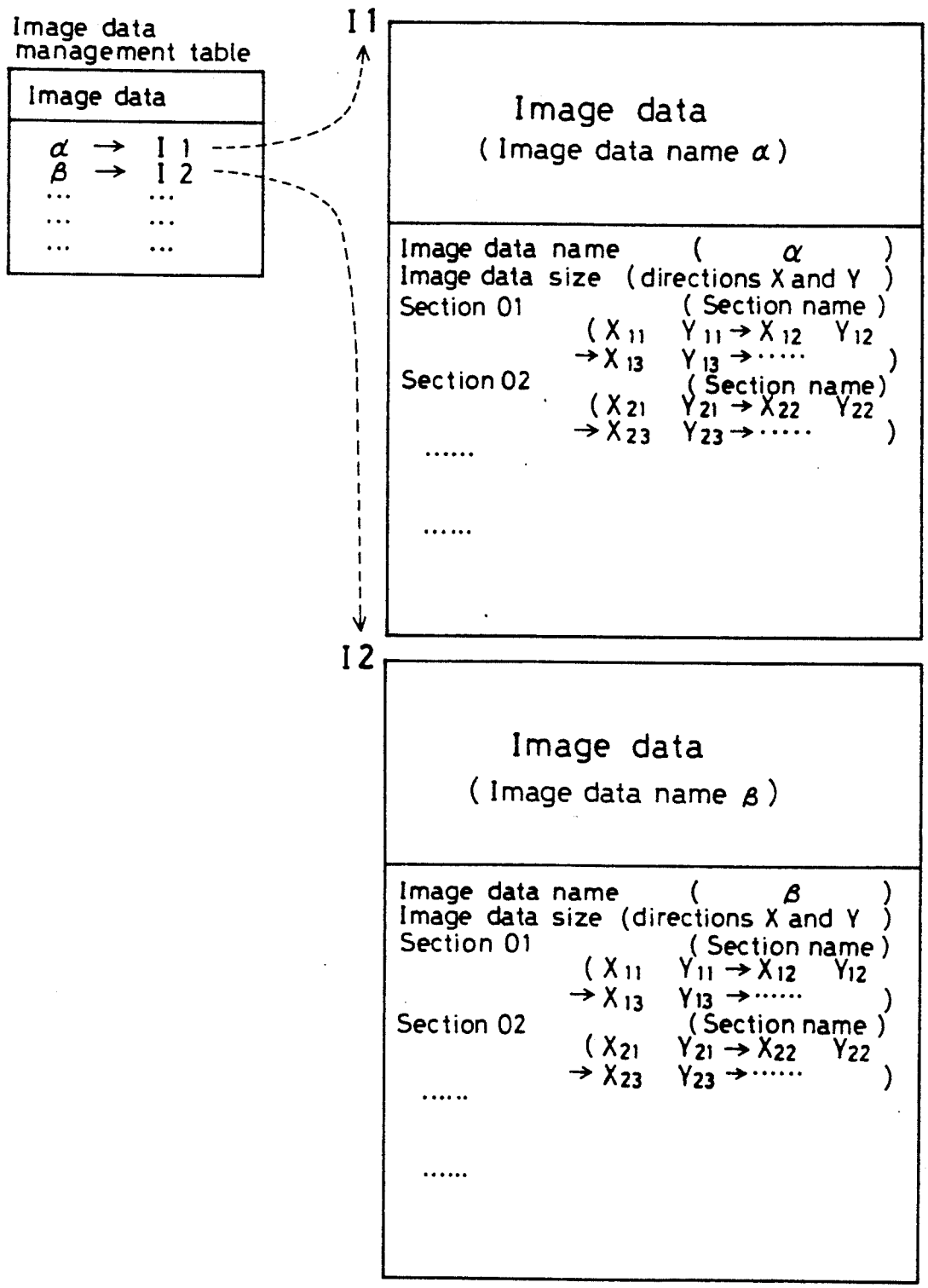
FIG. 7 illustrates an example of the storage of image data.

FIG. 7 shows an example of the storage of image data into a memory. The arrangement is such that the desired image data is retrieved from a management table for image data $\alpha, \beta, \ldots$, and the one of the storage areas I1, I2, ... which is stored with the retrieved image data is entered by using the associated pointer. Each data storage area has a region for storing image data and a region for storing information about the size of the image data and also storing section information, which is defined by coordinates $X_{11}, Y_{11} \rightarrow X_{12}, Y_{12} \rightarrow \ldots$, input by using a pointing device. Accordingly, in a case where such image data is displayed on the screen to set early attendance and overtime work for each area of work, the coordinates of each section are reduced in terms of the coordinates of the origin of the image data, thereby enabling recognition of the area designated by using a pointing device, for example.

Information required for the management of arrangement and delivery of machines is similarly input by using the image scanner and registered for each section. In regard to the arrangement and delivery of machines, for example, a place in the work site where each machine is to be used can be registered by designating the place on a layout drawing, and automatic delivery can also be realized by sequentially designating the delivery route from the starting point to the end point and using the resulting data as a control signal for a delivery robot.

Figure 8:
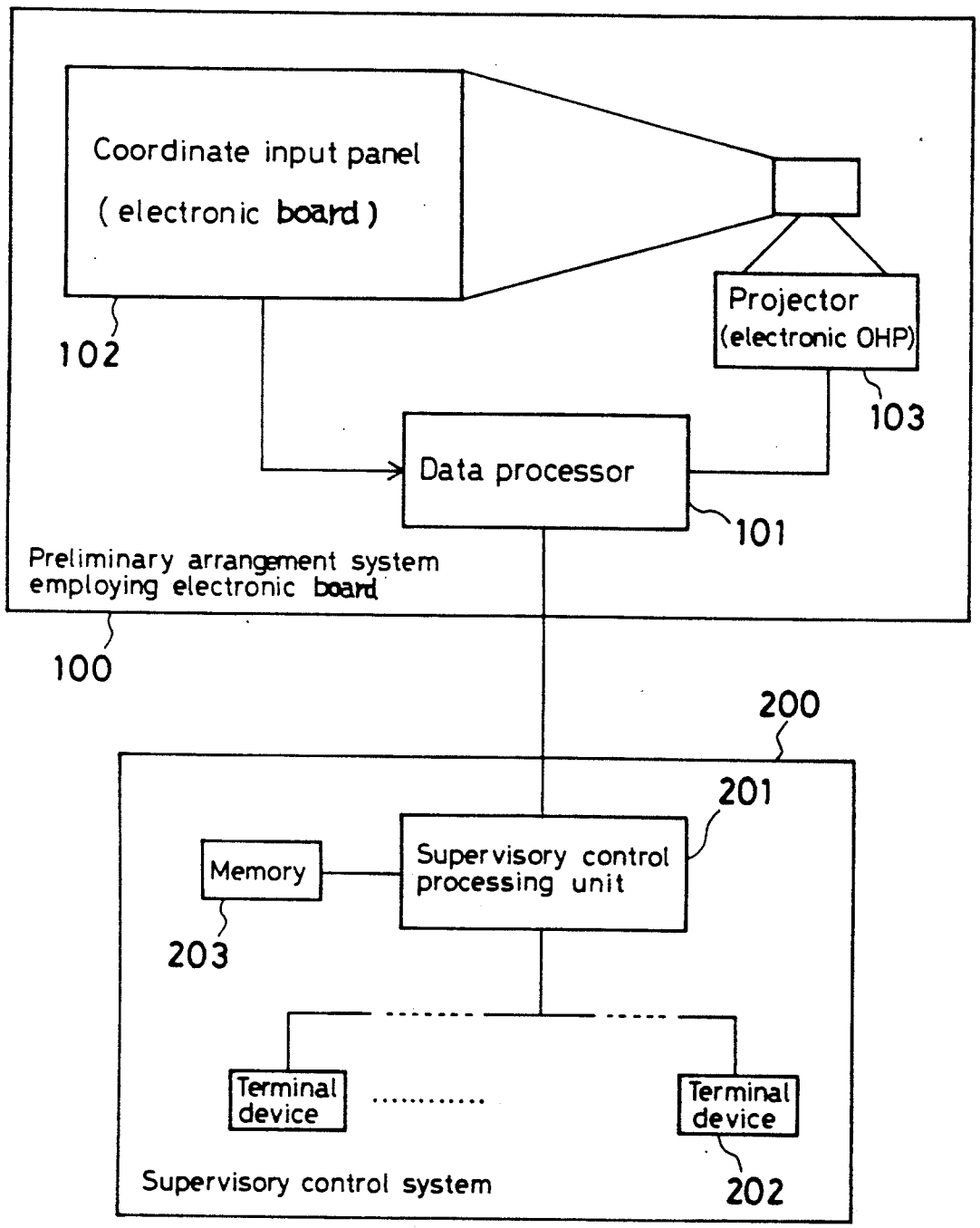
FIG. 8 is a block diagram of one embodiment of a system for controlling a temporary facility at a work site according to the present invention.

When a work schedule has been made, as described above, it is possible to extract the times at which temporary lighting equipment is turned on and off. Therefore, information about the time schedule of the temporary lighting equipment is transferred to a supervisory control system to effect automatic control of the temporary lighting equipment. FIG. 8 shows the relationship between the above-described preliminary arrangement system, employing the electronic board, and the supervisory control system.

Referring to FIG. 8, the preliminary arrangement system 100 comprises a data processor 101 for processing preliminary arrangement information, a large-sized coordinate input panel 102 likened to a board, and a projector (electronic OHP) 103 that projects electronic information onto the coordinate input panel 102. In this preliminary arrangement system, preliminary arrangement information, e.g., a work schedule and safety instruction form, is visualized, and the image of such information is displayed on the coordinate input panel 102 from the projector 103. In the meantime, information that is input coordinately on the projection screen of the coordinate input panel 102 or information that is input from an input-output unit (not shown) is delivered to the data processor 101 to execute input, generating, updating or other processing for each item to be prearranged. If necessary, given information is output to the projection screen of the coordinate input panel 102 through the projector 103 or output to the display screen of the input-output unit or from a printer, and among the pieces of output information, those which are used for the on-off control of the temporary lighting equipment are transferred to the supervisory control system 200.

The supervisory control system 200 has a supervisory control processing unit 201 that effects supervisory control of terminal devices 202, e.g., air conditioning, lighting and lifting equipment. The supervisory control processing unit 201, which has a program control function, effects supervisory control with respect to a designated port at a designated time with designated control contents. In the supervisory control system 200, when information for the on-off control of the temporary lighting equipment is transferred thereto from the preliminary arrangement system 100, the transferred information is set in the program control function of the supervisory control processing unit 201, thereby controlling the turning on-off of the temporary lighting equipment according to the working hours.

The following is a description of a supervisory control system which can also be applied to ordinary office buildings, multiple dwelling buildings, etc.

Figure 9:
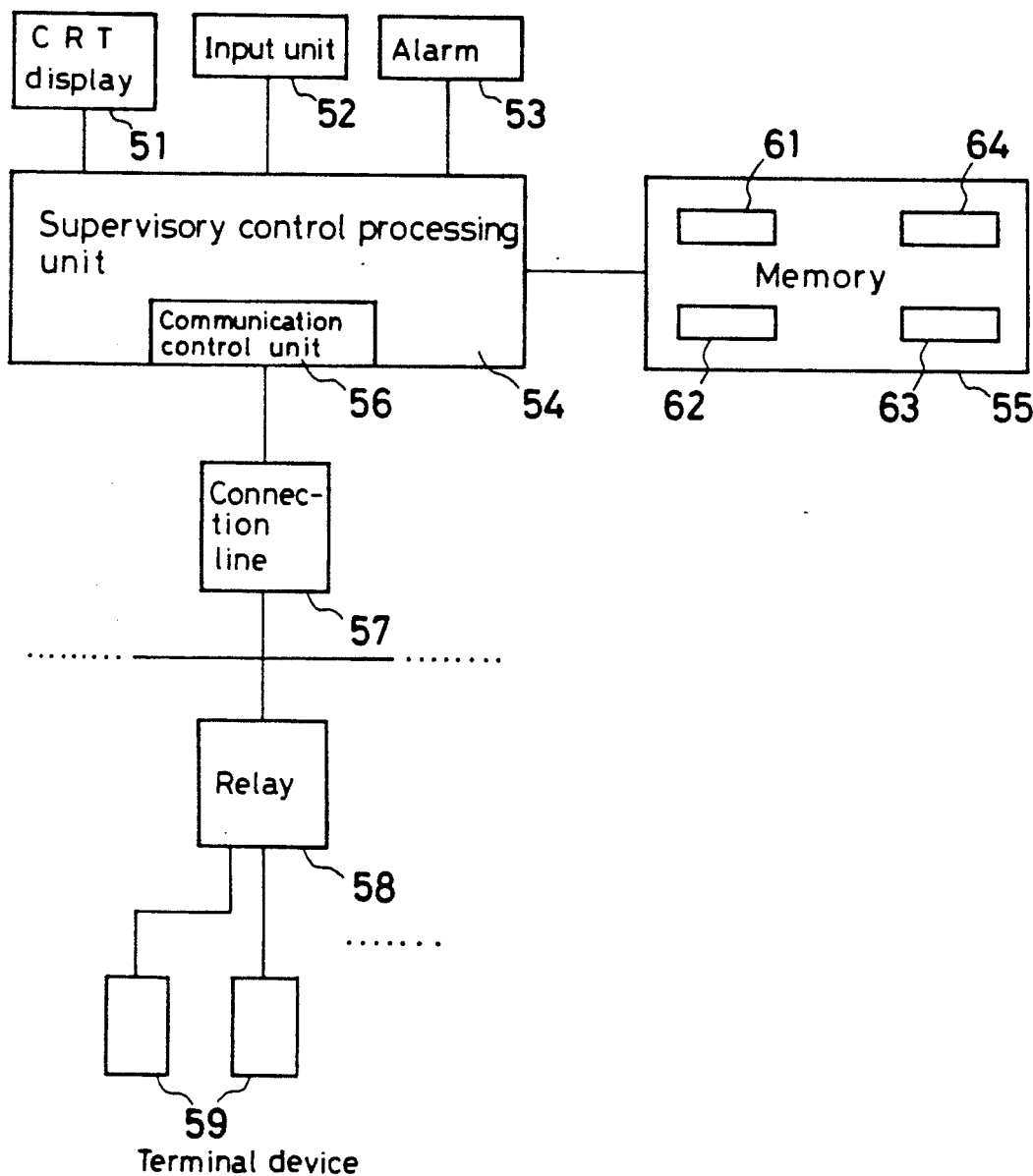
FIG. 9 is a block diagram of one embodiment of a supervisory control system according to the present invention.

Referring to FIG. 9, terminal devices 59 in the case of a building, for example, includes lighting equipment, pump, breaker, motor, lifting equipment, etc., which are objects of control, and protective relay contacts, switch contacts, burglar sensor, fire sensor, measuring sensors (thermometer, hygrometer, flowmeter, pressure gauge, water level indicator, ammeter, voltmeter, wattmeter, etc.), which are objects of supervision. A relay 58 is arranged to relay a state supervisory signal and a control signal between each block of terminal devices 59 and a supervisory control processing unit 54.

A CRT display 51 displays the state of each terminal device 59 which is under supervisory control, a control command input frame, and a supervisory control system setting frame. An input unit 52 is a mouse or a keyboard, which is used to input data for setting and changing a supervisory control system, select one from among terminal devices displayed on the screen of the CRT display 51, and input a control command. An alarm 53 gives an alarm when the state of a terminal device is abnormal.

The supervisory control processing unit 54 has a communication control unit 56 for controlling the communication between the same and each relay 58 and executes rewriting and updating of each table and other data stored in a memory 55, input-output information processing for the CRT display 51, the input unit 52 and the alarm 53, transmission of a control signal that is applied to a terminal device 59 through the associated relay 58, and reception of a supervisory signal.

The memory 55 stores a layout drawing table 61, a state supervisory table 62, control tables 63 and 64, and other data necessary for supervisory control. These tables and data are set and updated by the supervisory control processing unit 54 on the basis of information input from the input unit 52. The layout drawing table 61 comprises data for drawing and developing a layout or a system in an area to be placed under supervisory control on the CRT display 51. The layout drawing table 61 is split into a number of frames which corresponds to the scale of the system, and it adopts a multi-level data structure. In the case of supervisory control applied to a building, for example, the layout drawing table 61 may have frames alloted to a layout of each floor of the building, air conditioning and electric power systems, a security zone or a fire protection zone, which may cover the whole building or may be set for every plurality of floors. The state supervisory table 62 has, for each of the line-connected port Nos., at least information about the on/off state, the availability of an alarm, the corresponding device and display information to be displayed in correspondence to the frame placed under the management of the layout drawing table 61, that is, layout information, as shown in FIG. 10A. The control table 63 has, for each port No., information about an operation command, e.g., an on/off, increment/decrement or raise/lower command, confirmation information needed when the command is issued, the corresponding device, and display information to be displayed in correspondence to the frame placed under the management of the layout drawing table 61, as shown in FIG. 10B. The port No. is provided for each on/off state of each device or for each command given to each device. That is, the port Nos. are the respective numbers of state supervisory items and control items. The confirmation information may be designated with the port No. in the state supervisory table 62. In such a case, for example, if no state information corresponding to a command is available when the state of the port No. in the supervisory table 62 is checked, an alarm is given. The control table 64 has information for controlling operations such as analysis of input information from the input unit 42, switching of displayed frames from one to another, switching of a frame, when an abnormality occurs, in accordance with the state of the abnormality, and transmission of a command to a terminal device.

Thus, a layout or a system in an area to be placed under supervisory control is set by using the layout drawing table 61, while devices which are to be placed under supervisory control are set by using the state supervisory table 62 and the control table 63, and the layout and other information are displayed on the CRT display 51. It is therefore possible to cope flexibly with a change in the layout and also a change in the devices to be subjected to supervisory control.

The connection line 57 comprises a private cable or a public communication network. The connection line 57 may be a wireless network that comprises a combination of a wireless transmitter and a wireless receiver and uses a radio wave or an ultrasonic wave. It is also possible to connect with each terminal device through a wireless modem, a LAN (local-area network) Server, or a LAN station.

Next, the operation will be described.

Figure 11:
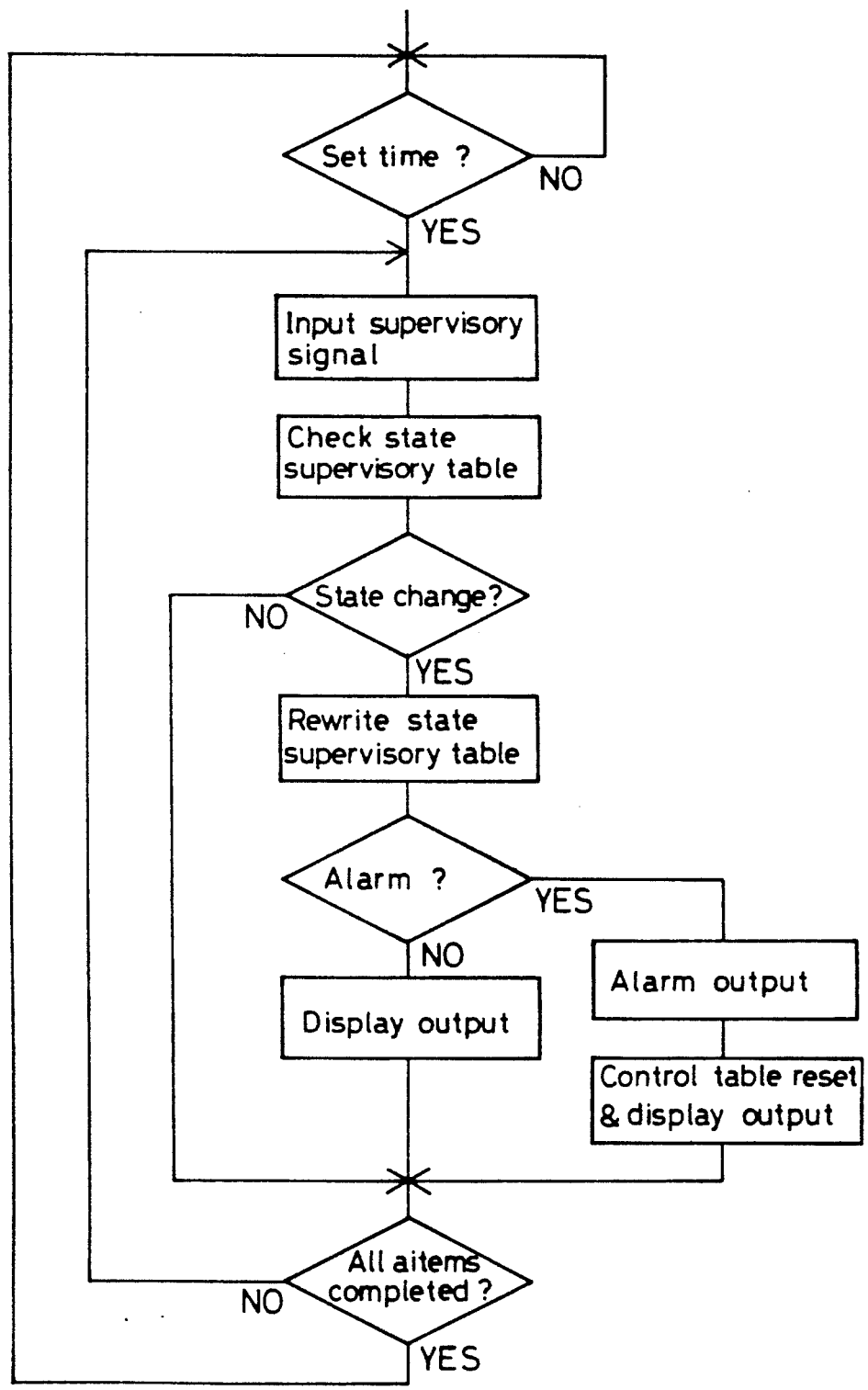
FIG. 11 is a flowchart showing a supervisory operation.

First, the state supervision of each terminal device will be explained. As shown in FIG. 11, a state signal is input from each terminal device every set time. The state signal represents a port No. (item) and the state thereof, as shown exemplarily in FIG. 13A. The state signal is checked with the state supervisory table 62 shown in FIG. 10A for the presence of a change in the state of the terminal device. If there is no change in the state, the process shifts to the next item, whereas, if there is a change in the state, the state in the state supervisory table 62 is rewritten. Further, it is checked whether or not an alarm has been set. If no alarm has been set, the indication is changed to a new state, and the process then shifts to the next item. If an alarm has been set, the alarm is output, and the indication is changed to a new state, and then the process shifts to the next item. It should be noted that state signals include binary signals, e.g., an on/off signal, an increment/decrement signal, etc., and multi-valued signals from measuring sensors. The above-described process is executed for all the state supervisory items. Accordingly, the items are ordered so that an important item which needs output of an alarm is set at a higher rank.

In the state supervision, state signals are input cyclically to effect periodic supervision of the device state, as described above. In the meantime, the control process includes timer control in which a control signal is delivered at a set time, and manual control in which a control signal is given from the input unit 52 at any time. These control operations are executed as follows.

Figure 12:
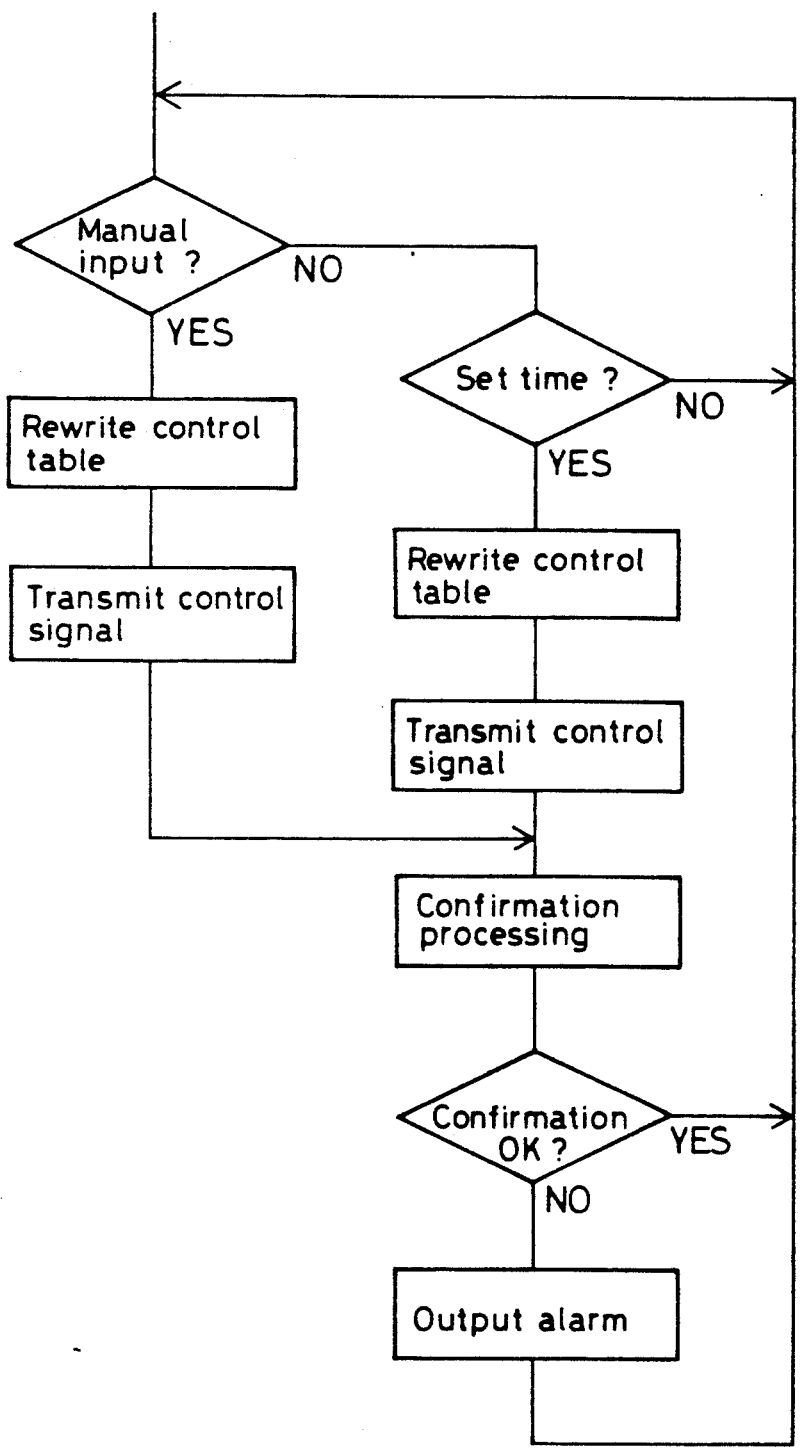
FIG. 12 is a flowchart showing a control operation.
Figures 13A, 13B, 13C, 13D:
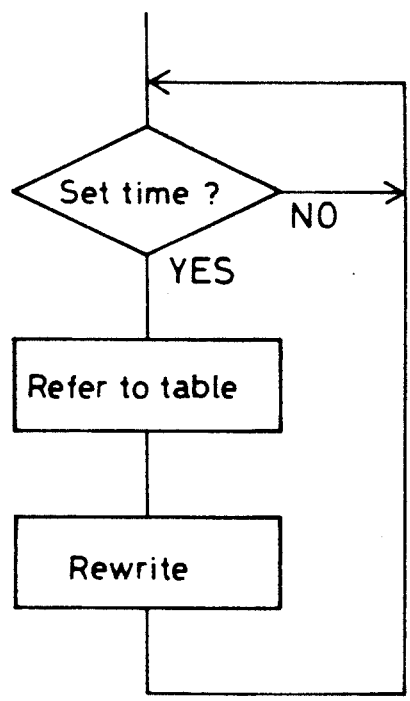
FIGS. 13(A)–13(D) show examples of supervisory signals and also illustrates timer control and alarm setting.

Referring to FIG. 12, when a manual control signal is input from the input unit 52, the control table shown in FIG. 10B is referred to and rewritten with a control command and the control signal is delivered. When there is no manual control input, it is judged whether the set time has been reached. At the set time, the control table is rewritten with a control command, and the control signal is delivered. In this timer control, a timer control table stored with each set time and port Nos., as shown in FIG. 13B, is employed. More specifically, the timer control table is referred to, and when a set time registered on this table is reached, the control signal of the corresponding port No. is delivered. Accordingly, in the present invention, when the times at which a temporary lighting equipment are to be turned on and off are transferred from the preliminary arrangement system 100 as control information, the turning-on time, the port No. of the temporary lighting equipment which is to be turned on, the turning-off time and the port No. of the temporary lighting equipment which is to be turned off are written on the timer control table.

After a control signal is delivered by either the manual or timer control, confirmation processing is executed on the basis of the confirmation information in the control table. In this processing, for example, a port No. in the state supervisory table shown in FIG. 10A is set as confirmation information, and a change in the state of this port No. is checked. As a result, if a predetermined state change is confirmed, i.e., O.K., the process returns to the start of the control program, whereas, if the predetermined state change cannot be confirmed, an alarm is output, thereby reporting a control abnormality.

There are differences in the way of daily control and supervision between a work site in a building under construction and an office building on the one hand and a multiple dwelling building on the other. In the case of security supervision, for example, in the former great importance is placed on the supervision at night during which no one is attendant, whereas in the latter great importance is placed on the supervision in the daytime during which the residents are likely to be absent. Further, in the case of the former, abnormalities in facilities such as air conditioning, lighting and lifting equipment, exclusive of security and fire protection equipment, may be ignored at night during which no one is attendant. In such state supervision, therefore, alarm for such facilities may be arranged to be effective-not for 24 hours but only for a limited period of time. FIG. 13 shows an example of alarm setting in accordance with time. In this example, an alarm setting table shown in FIG. 13D is provided, and the column of "alarm" in the state supervisory table shown in FIG. 10A is automatically rewritten by the control process shown in FIG. 13C. More specifically, the alarm setting table is referred to every set time, and the "alarm" column of the designated port No. in the state supervisory table is rewritten with the designated contents. In the example shown in FIG. 13D, the port No. 001 is set to "1" (alarm is available) for the period of from 8 o'clock to 20 o'clock.

It should be noted that the present invention is not necessarily limited to the above-described embodiment and that various modifications may be imparted thereto. For example, although in the foregoing embodiment the present invention is employed to make preliminary arrangements at a meeting held at a work site, the invention may similarly be applied to other meetings. The arrangement may also be such that a plurality of electronic boards and card readers are connected by a communication network, and the same data is projected on these electronic boards, thereby enabling preliminary arrangements to be made simultaneously at different places. Further, the present invention may be employed for material management, for example, to check the stock on the basis of a record of incoming and outgoing materials at each section, and the present invention may also be arranged to totalize early attendance and overtime working hours, as a matter of course. In the case of an ordinary preliminary meeting, a card reader is not always necessary as an input means because a combination of an keyboard, an image scanner and an electronic board will suffice for this purpose.

In addition, although in the foregoing embodiment the present invention has been described with regard to the control of temporary lighting equipment, the present invention may be arranged not only to effect the temporary lighting control but also to switch on/off a power supply of other temporary equipment and control the connection of a communication network for security and fire protection at a work site at night during which it is unattended. By doing so, it is possible to cope with such a situation that the person in charge forgets to switch off the power supply of the equipment or to set security and fire protection measures. Although in the foregoing embodiment each port No. is associated with the corresponding equipment and control information, the arrangement may be such that the port No. is used only to designate the corresponding equipment, and control information as to whether the equipment is to be turned on or off is added separately.

As will be clear from the foregoing description, according to the present invention, a coordinate value that is input from the coordinate input panel is recognized in correspondence to electronic information projected on the coordinate input panel by the projector. Accordingly, it is possible to make preliminary arrangements while inputting and amending data on the screen of the coordinate input panel by editing data that is input from a data input unit, the coordiante input panel or a card reader and projecting a form, a chart or a drawing on the coordinate input panel from the projector. Moreover, it is possible to readily execute writing, updating, insertion, copy and so forth of data on the coordinate input panel by using a special input pen or the like such as has heretofore been employed.

Accordingly, by projecting electronic information input from each input means on the coordinate input panel in the form of a document, a chart or a drawing and also displaying function keys on the screen of the panel so that they can be operated to select a frame as desired, preliminary arrangements can be made even more efficiently than in the case where a board or a paper chart is employed as in the conventional practice.

In particular, since it is possible to execute point designation and input necessary information on a frame which is produced from image information read by an image scanner, it is possible to develop the displayed image as desired while carrying on a meeting of a plurality of members to thereby execute various operations such as preparation of a schedule, decision-making and control of delivery.

Further, since it is possible to select and set necessary data on a form, a chart or a drawing which is selectively displayed on the electronic board, preliminary arrangements can be made speedily without any trouble to input data, so that the time required for preliminary arrangements can be shortened.

If a plurality of electronic boards and projectors are connected by using a communication network to make arrangements on the basis of the same frame, it is possible to make arrangements on the same contents simultaneously at different places even if a large place for a preliminary meeting is not available.

In addition, since the temporary lighting turning-off control can be automatically set on the basis of the contents of the preliminary arrangements for work, even if there is a change in the work schedule, it is unnecessary to change the input data for the temporary lighting control system. Thus, it is possible to realize full automatic temporary lighting control. Since the turning on-off of temporary lighting equipment can be controlled for each area of work, it is possible to reduce the waste of power consumption. In addition, since there is no need to turn off the temporary lighting inside the work area, it is possible to eliminate the conventional problem that the person in charge must return in the dark after turning off the lighting equipment. It is also possible to ensure lighting for a passage, a stair, etc.

What we claim is:

1. A work management system employing an electronic board, comprising:
   input means having a function of inputting coordinate information from the surface of a panel;
   output means having a function of projecting electronic information on said panel; and
   data processing means for executing a predetermined processing, including at least one of preparation and input processing of a form, a chart or a drawing, retrieval, editing, and totalization, by establishing a correspondence between the information projected on said panel by using said output means and the coordinate information input from said input means, said data processing means being arranged to execute said input processing of a form, a chart or a drawing such that, when coordinate information is input from one point for an entry column for a designated item, said data processing means displays a list of registered items to be designated in a window for selection of one of said items, whereas, when coordinate information is input from two points for an entry column for time setting, said data processing means draws a bar between said two points.

2. A work management system according to claim 1, wherein said input means has an image input function, said data processing means being arranged to project an input image on said panel by using said output means and enable a section to be set on the image data by inputting coordinate information.

3. A work management system according to claim 1, wherein said window for displaying a list of items to be designated is provided with an item for selecting a handwriting mode, in which handwritten characters can be input from the surface of said panel by using said coordinate input function.

4. A work management system employing an electronic board, comprising:
   input means including a card reader that reads information stored in a memory card, a data input unit capable of inputting image data, and a coordinate input panel for inputting positional information represented by X-coordinate and Y-coordinate values;
   output means including a projector that projects electronic information on said coordinate input panel, a display that displays electronic information on a screen, and a printer that prints out electronic information;
   data processing means for executing a predetermined processing, including preparation and input processing of at least one of a form, a chart or a drawing, retrieval, editing, and totalization, by recognizing coordinate values input from said coordinate input panel in correspondence to the electronic information projected on said coordinate input panel and combining the recognized information with data read by said card reader and data input from said data input unit, and said data processing means further executing storage of data into a memory and output processing of data to said output means, thereby enabling preliminary arrangements to be made on the basis of data that is coordinate-input from an image of electronic information displayed on said coordinate input panel.

5. A work management system according to claim 4, wherein said card reader is installed at an entrance/exit gate of a work site to read a memory card stored with information characteristic of each individual worker when the worker enters and leaves said work site, said data processing means being arranged to retrieve, edit and totalize information read by said card reader to prepare a form, a chart or a drawing and output it.

6. A work management system according to claim 4, wherein said data input unit has an image scanner so that image data input by said image scanner can be mixed with data input by another of said input means.

7. A work management system employing an electronic board for controlling equipment at a work site, including temporary lighting equipment, in accordance with working hours, comprising a preliminary arrangement system for executing input, generation, updating and other processing for items to be prearranged for work concerning a work schedule and safety instruction form or the like by using said electronic board, and a supervisory control system for effecting supervisory control of equipment at a work site, including temporary lighting equipment, wherein said preliminary arrangement system generates control information conformable to working hours of equipment to be controlled from the results of input, generation, updating or other processing executed for the items to be prearranged and transfers said control information to said supervisory control system to effect supervisory control of said equipment on the basis of said control information.

8. A work management system according to claim 7, wherein said preliminary arrangement system comprises a data processor for processing preliminary arrangement information, a large-sized coordinate input panel likened to a board, and a projector for projecting electronic information onto said coordinate input panel.

9. A work management system according to claim 7, wherein said supervisory control system includes a supervisory control processing unit having a program control function by which, when at least one of a time and a port is designated as supervisory control information, supervisory control of terminal equipment is effected on the basis of at least one of the designated time and port, so that setting of control information is made from said preliminary arrangement system with respect to said program control function.

* * * * *